United States Patent [19]
Cohen

[11] 4,235,795
[45] Nov. 25, 1980

[54] METHOD FOR EXTRACTING FATTY ACIDS FROM SHORTENING

[76] Inventor: Marvin D. Cohen, 10719 Sandpiper, Houston, Tex. 77096

[21] Appl. No.: 953,173

[22] Filed: Oct. 20, 1978

[51] Int. Cl.$^3$ .......................... C09F 5/10; C11B 3/00; A23C 12/02

[52] U.S. Cl. .................................... 260/428; 426/417; 426/423; 210/502; 210/DIG. 8; 210/778

[58] Field of Search ................ 260/428; 426/417, 423; 210/75, 502, DIG. 8

[56] References Cited

U.S. PATENT DOCUMENTS

| | | | |
|---|---|---|---|
| 3,231,390 | 1/1966 | Hoover | 426/417 |
| 3,996,158 | 12/1976 | Cohen | 252/459 |

*Primary Examiner*—John F. Niebling
*Attorney, Agent, or Firm*—Reiter Bernard A.

[57] ABSTRACT

This invention relates to an improved method for removing fatty acids from shortening ingredients such as is used in the preparation of foods by the deep-frying method. More particularly, this invention relates to a new and improved filtration powder used in the extraction of fatty acids from shortening used in a variety of cooking processes such as deep frying, and which requires a singular pass of shortening, containing the powder through a filter cloth in order to extract the fatty acid from the shortening. The filtration material constitutes a powder-like glassy rhyolite, specifically pumicite, contained in a cellulose filter paper or the like and through which the cooking shortening circulates or through which the cooking shortening may be circulated for purposes of removing the saturated fatty acids.

6 Claims, No Drawings

METHOD FOR EXTRACTING FATTY ACIDS FROM SHORTENING

BACKGROUND OF THE INVENTION

The utilization of cooking greases and oils on a repetitive basis, commonly results in the extraction of fatty acids from the grease, oil or other shortening material. After a period of time, depending upon the quantity of shortening material and magnitude of food processed therein, the saturated fatty acids extracted from the food material increase until the saturated fatty acids predominate over those of the unsaturated fatty acids which may characterize the shortening material prior to the cooking process. These saturated fatty acids produce adverse characteristics in the foods prepared in the shortening material, these adverse characteristics manifesting themselves in the form of excess grease in the foods and a bad taste as if the food were burned. It is apparent, therefore, that the optimal preparation of the food product requires that the shortening material be changed on a regular basis, that is, replaced with new shortening material or a method must be found to remove the saturated fatty acids therefrom. The cost of replacing the shortening material as it becomes increasingly more saturated due to the extraction of saturated fatty acids from the food being fried, is considerably higher than the cost of filtering the saturated fatty acids from the shortening material. Presently, shortening filters are relatively ineffective in that they have a relatively short life and do not entirely remove the greasy and burned taste from the prepared food over any prolonged time. Moreover, the shortening must be recirculated through the filter many times. Therefore, the need to replace the shortening material occurs fairly promptly or it must be regularly recirculated until the shortening must be replaced, and as a consequence thereof, the cost of preparing the food itself is markedly increased over that which could be accomplished if an effective filtration media were discovered and which could function over a protracted period of time.

DESCRIPTION OF THE INVENTION

This invention pertains to the discovery and utilization of pumicite, a specia of rhyolite, as a compound additive for use in the extraction of saturated fatty acids from shortening used in cooking processes, primarily in as in deep frying. The invention finds particular use in commercial environs where the shortening material is recycled and reused for the deep frying of fast food products such as chicken, french fries, fish sticks, and the like.

Pumicite particulate appears as a powder which is chemically inert, does not dissolve in liquids, non-hygroscopic and physically consists of tiny cellular spheroids. It has been found that this material manifests a surprising affinity for saturated fatty acids such as those found in fried chicken. It has been found, for example, that the more polar saturated fatty acids become totally absorbed by the pumicite filter because these fatty acids have a much greater affinity for this type of filter substrait than the unsaturated fatty acids.

The pumicite type filter is a volcanic ash, broadly termed rhyolite and constitutes a volcanic, mostly effusive, glass-like equivalent of granite. The glassy rhyolites include obsidian, pitch stone, and pumice (or pumicite). Through microscopic examination it is shown that pumices are actually ash flows and thus better described as tufts. These ash flows or tufts are characterized by a crystalline pattern which is generally thread-like or fibrous in shape and are further indicated by thin partitions between the vesicles. Rhyolite and trachyte types of pumices are white and generally have a specific gravity of the glass in the range of 2.3 to 2.4. The crystalline shape of pumicite may be contrasted with perlite, for example, which is tear-dropped or concentrically onion-shaped in form.

The rhyolites are known from all parts of the earth. Obsidian is well developed in Montana and the general locale. Pitch stone, of particular interest as a rock glass containing several percent of combined water, is found in Australia and other localities including Scotland. Pumicites, a frozen emulsion of air and lava or rhyolitic composition, occurs in various areas of North America, for example.

Small crystals of various minerals occur in many pumices; the most common are feldspar, augite, hornblend and zircon. The cavities of pumices are generally elongated or tubular, as indicated above, this being due to their origination from a lava flow of constantly solidifying character. The chemical composition of rhyolite and trachyte pumices generally include about 75% silica. For purposes of the invention described herein, however, it is desirable to use pumices containing silica contents in the range of 80% or more. Specifically, expanded pumicite which is described hereinafter, constitutes a volcanic dust comprised of a silicate rather than a silica. When expanded, the pumicite changes from its flat irregular particles or shards to countless tiny glass-sealed hollow spheres or air cells increasing in volume from ten to fifteen times its original size. The preferred pumicite composition includes silicon dioxide ($SiO_2$) in the range of 80% or more, iron dioxide ($Fe_2O_3$) in the range of 2% and trace quanities of suphur dioxide ($SO_3$) and magnesium oxide ($M_gO$) of about 3%. Moisture content comprises about 3% maximum. The physical form of pumicite is in an extremely fine white powder and is chemically inert. Its thermal conductivity is less than 0.3 BTU per hour per square foot per degree Fahrenheit per inch. (75 degress F. mean). It has a water absorption characterisitic in the range of 700 to 800 pounds per 100 pounds. The pumicite, which is expanded in accordance with the explanation set in my earlier U.S. Pat. No. 3,996,158 has a density of from 4.8 to 6 pounds per cubic foot. The expanded material does not require grindings since it is in the size range of 325 mesh, while retaining the microspherical configuration of the particle. The extremely fine pulverulent of pumicite substantially exceeds other forms of rhyolites including obsidian and pitch stone. Its pulverulents substantially exceeds perlite also. This is the case because pumices, as mentioned above, are actually ash flows, and by contrast to other rhyolites, such as obsidian and pitch stone, are better designated technically as "tufts". These tufts are frequently so light as to be present in the atmosphere as volcanic dust.

The expanded pumicite particulates of the invention have exceptional abilities and characteristics as a filter aid in the extraction fatty acids from cooking shortening. This was heretofore unknown. It is found, for example, that the life of cooking shortening in commercial uses is substantially extended due to the fact that filtration techniques using heat-expanded pumicite particulates continued to extract saturated fatty acids for a 20% longer time period than filter aids presently used in commercial frying operations. Most important are the savings accruing as a result of having to pass the shortening a single time through the filter when the shortening is carrying the powder. This is due in part to the total absorptive capacity of the pumicite particulates. As a consequence of effective filtering for a longer time period, the shortening does not need to be removed and new shortening added as quickly, and therefore, the cost of conducting the frying operation is reduced. Also, it is found that the shortening does not become saturated as quickly with saturated fatty acids extracted from the food being fried. As a result, the quality of the food being prepared is improved since such food does not tend to absorb grease as quickly. Also, the food is not characterized by the "burned" or rancid taste which is characteristic when the cooking shortening has become saturated or approaches saturation with fatty acids.

In development of the heat-expanded pumicite particulate type filter for deep fat frying of foods which is the subject hereof, infrared examination of new and unused shortening characteristics were carried out. These tests showed that approximately 80% of the fat therein to be unsaturated in nature. As the shortening (a dehydrogenated vegetable oil containing a methyl ester) is used, it becomes increasingly more saturated due to the extraction of the saturated fatty acids from the food (such as chicken). After approximately five days of frying in the shortening, the saturated fatty acids were found to predominate over that of the unsaturated fatty acids. In one experiment, the amount of pumicite particulates used constituted less than 0.1% by weight of the shortening. Subsequent experiments were performed wherein volume of the heat-expanded pumicite particulate filter aid was approximately doubled (0.2% by weight), and the ratio of fatty acids acids were measured. The saturated fatty acids were found to be totally absorbed as well as permitting the excess unsaturated fatty acids to pass through the filter bed. The amount of increase in saturated fatty acids in the shortening after a five-day period was found to be approximately 50% or 0.2% by weight of the filter aid to the shortening rather than the 80% reported for an 0.8% by weight (first experiment). The total free acidity of the oil (shortening) was found to diminish by almost one-half, this further demonstrating the effectiveness of the new filter aid in affecting absorption of the various fatty acids present.

In the absence of the improved filter aid hereof, the dehydrogenated cooking oil was found to lose approximately 17% by weight over a period of seven days. With the addition of the present filter aid, the loss in shortening is diminished to approximately 8% by weight over the same time period.

In operation, the present filter aid may be used in a number of ways. The current exemplary method is set forth solely as a vehicle for clearly understanding a given method of use:

In a given deep frying operation, processing chicken pieces for commercial sale, approximately 80 pounds of dehydrogenated vegetable oil (containing a methyl ester) is introduced into a thermostatically-controlled deep frying vat or cooker and slowly heated to 350 degrees F. Approximately 130 to 150 chickens weighing about two pounds each are fried daily in the above shortening. In addition, about ten to twelve pounds of gizzards are also fried each day. Filtration of the shortening is conducted twice daily, the first at about 2 p.m. in the afternoon and the second at about 7 p.m. in the evening.

The heat expanded pumicite particulate filter, in amount constituting sixteen ounces by volume, is added directly to the vat of hot oil and allowed to disperse in the oil before it is circulated and filtered onto a cellulose-type filter. In this type of filtration, the oil is allowed to re-circulate for approximately twelve to fifteen so that it lays down a uniform filter cake. In an alternate method of filtration, the heat-expanded pumicite particulates may be mixed (in amount one part (16 oz.) by volume of the particulates to 16 oz. by volume of the hot oil) and poured evenly onto a cellulose or the like filter pad. A uniform filter cake is thus formed and this cuts down on the recirculation time by approximately 20%. The used oil is then filtered through the pre-formed filter bed. The spent filter is then scraped to remove the used pumicite particulates. This procedure is continued until some 1,000 to 1,200 chickens and 125 to 150 pounds of gizzards have been fried. The shortening is then discarded and new unused shortening is installed.

It is to be understood that variations and modification of the invention may be made without departing from the spirit hereof. It is also to be understood that the scope of the invention is not to be interpreted as limited to the specific embodiments disclosed herein but only in accordance with the appended claims, when read in the light of the foregoing description.

What is claimed and desired to be secured by United States Letters Patent is:

1. In the method for extending the life of shortening used in deep frying cooking processes comprising the steps of:

introducing directly to the vat of shortening a filter aid material comprising heat-expanded pumicite particulates allowing the particulates to disperse in the shortening circulating the shortening and particulates therein and conducting a singular pass of shortening carrying the particulates onto and through a filter structure.

2. The method of extracting saturated fatty acids from shortening used in the processing of deep fried foods comprising the step of passing the shortening once through a filter bed of heat-expanded pumicite particulates constituting in the range of 0.2% by weight of the particulates to the amount of shortening being filtered.

3. The method of preparing a filter cake for extracting fatty acids from the shortening used in deep frying of foods comprisng the steps of:

mixing one part by volume of a heat-expanded pumicitic particulate with one part by volume of the shortening, pouring the mixture onto a cellulose filter pad, allowing the mixture to form a filter cake, and utilizing the filter cake by passing the shortening once therethrough in order to extract the saturated fatty acids from the shortening.

4. In the method for extending the life of shortening used in deep frying cooking processes and in which the shortening is characterized by saturated fatty acids and unsaturated fatty acids, the former of which produce adverse characterisitics in the food prepared in the shortening, such as rancidity, but wherein the latter of which may constitute a desirable characteristic, comprising the steps of:

introducing directly to the vat of shortening a filter aid material consisting of a rhyolitic, effusive volcanic dust of the pumicitic specia pre-expanded and pre-exploded so as to exist in the form of a pulverulent powder;

allowing the powder to disperse in the shortening;

circulating the shortening and powder therein;

and conducting a singular pass of the shortening carrying the powder onto and through a filter structure.

5. The method of extracting substantially only saturated fatty acids from a shortening containing both saturated fatty acids and unsaturated fatty acids, all used in the processing of deep fried foods or the like, comprising the step of passing the shortening once through a filter bed of heat-expanded pumicite particulates consisting in the range of 0.2% by weight of the particulates to the amount of shortening being filtered.

6. The method of preparing a filter cake for extracting saturated fatty acids from a shortening material which includes both saturated fatty acids and unsaturated fatty acids used in deep frying of foods, comprising the steps of:

mixing one part by volume of a heat-expanded pumicitic particulate with one part by volume of the shortening;

pouring the mixture onto a cellulose filter pad;

allowing the mixture to form a filter cake, and utilizing the filter cake by passing the shortening once therethrough in order to extract the saturated fatty acids from the shortening and thereby prolong the useful life thereof.

* * * * *